United States Patent [19]

Iwasa et al.

[11] Patent Number: 4,670,314
[45] Date of Patent: Jun. 2, 1987

[54] COLORED JACKET FOR FLOPPY DISK

[75] Inventors: Masakazu Iwasa; Kazuhiko Morita, both of Kanagawa; Sadao Nakatani; Eiji Nakamura, both of Tokyo, all of Japan

[73] Assignees: Fuji Photo Film Co., Ltd.; Sumitomo Bakelite Co., Ltd., Japan

[21] Appl. No.: 772,056

[22] Filed: Sep. 3, 1985

[30] Foreign Application Priority Data

Sep. 6, 1984 [JP] Japan ................................ 59-186886
Sep. 6, 1984 [JP] Japan ................................ 59-186887

[51] Int. Cl.$^4$ ............................................. B65D 5/00
[52] U.S. Cl. ...................................... 428/35; 428/328
[58] Field of Search ................................. 428/35, 328

[56] References Cited

U.S. PATENT DOCUMENTS 4,578,296  3/1986  Miyazaki et al. ..................... 428/35

Primary Examiner—Marion C. McCamish
Attorney, Agent, or Firm—Gerald J. Ferguson, Jr.; Michael P. Hoffman; Ronni S. Malamud

[57] ABSTRACT

A colored jacket for a floppy disk is fabricated by folding or bonding a plastic sheet or sheets containing at least one color pigment, and 5 to 50 parts by weight of an inorganic pigment per 100 parts by weight of a resin. Or, the plastic sheet or sheets contain at least one color pigment, 5 to 40 parts by weight of an inorganic pigment and 0.005 to 0.5 parts by weight of carbon black per 100 parts by weight of a resin.

7 Claims, No Drawings

COLORED JACKET FOR FLOPPY DISK

BACKGROUND OF THE INVENTION

1. Field of the Invention

This invention relates to a jacket for a floppy disk. This invention particularly relates to a jacket colored in a color other than black.

2. Description of the Prior Art

Flexible disks referred to as floppy disks or diskettes comprise a case (hereinafter referred to as the jacket) fabricated by folding a sheet of a plastic material such as polyvinyl chloride (PVC), polycarbonate or polyethylene terephthalate (PET) or bonding such sheets in bag form, and a disk-like magnetic recording medium (hereinafter referred to as the disk) rotatably housed in the jacket and composed of a flexible substrate made of PET or the like and a magnetic recording layer or layers overlaid on one or both surfaces of the substrate. The flexible disks are widely used as magnetic recording media for computers and word processors.

Liners such as nonwoven fabrics are overlaid on the inner surfaces of the jacket for protecting the disk, decreasing the rotation torque of the disk, and cleaning the disk surfaces. Carbon has been added to the jacket as a conductivity imparting agent for preventing static electricity from arising during recording, reproducing and handling of the flexible disk. When static electricity arises on the flexible disk, dust adheres thereto, drop-outs arise during recording and reproducing, and the disk surfaces are scratched. Therefore, it has been necessary to decrease the electric resistance of the jacket by the addition of carbon.

Addition of carbon to the flexible disk jacket material colors the jacket black. The conventional jacket has a black outer surface since it contains carbon and no other color pigment.

The black jacket is disadvantageous in that fingerprints are readily perceptible thereon. Therefore, in order to make the fingerprint imperceptible, the black jacket is normally embossed. As a result, the jacket production process becomes complicated. Even then it it not always possible to make fingerprints on the black jacket sufficiently imperceptible by embossing.

In order to eliminate the drawbacks of the black jacket, the inventors studied development of a jacket which is colored in a color other than black.

Coloring of the jacket is achieved by adding a color pigment to the jacket material (plastic sheet). However, the colored jacket has drawbacks in that light transmittance becomes higher than with the black jacket and that the light resistance, i.e. the resistance of the color to deterioration over time caused by light, becomes low.

Normally, the jacket is provided with a write enabling notch and an index window detected by a light sensor in the disk drive unit so that writing, reading and erasing of information on the disk housed in the jacket are conducted correctly. When the light transmittance increases at sections other than those provided with the write enabling notch and the index window, there arises the risk of the light sensor mechanism malfunctioning. Therefore, the light transmittance must be decreased to conduct information recording correctly.

Also, since the jacket is generally stored or repeatedly used over long periods, it should exhibit sufficient light resistance so that the color is not deteriorated readily.

SUMMARY OF THE INVENTION

The primary object of the present invention is to provide a colored jacket for a floppy disk, which exhibits low light transmittance and good light resistance.

Another object of the present invention is to provide a colored jacket for a floppy disk, which exhibits good appearance and is suitable for classification by, e.g., application.

The present invention provides a colored jacket for a floppy disk fabricated by folding or bonding a plastic sheet or sheets in a bag form, wherein said plastic sheet or sheets contain at least one color pigment, and 5 to 50 parts by weight of an inorganic pigment per 100 parts by weight of a resin.

The present invention also provides a colored jacket for a floppy disk fabricated by folding or bonding a plastic sheet or sheets in a bag form, wherein said plastic sheet or sheets contain at least one color pigment, 5 to 40 parts by weight of an inorganic pigment and 0.005 to 0.5 part by weight of carbon black per 100 parts of a resin.

The colored jacket for a floppy disk in accordance with the present invention exhibits a practically desirable light transmittance (1% or less in accordance with JIS), and excellent light resistance. Also, it is easy to fabricate and resistant to surface scratching. Therefore, in accordance with the present invention, it is possible to obtain a colored jacket on which fingerprints are imperceptible, which exhibits good appearance, and which facilitates classification by application, and which can be handled in the same manner as the conventional black jacket.

DETAILED DESCRIPTION OF THE INVENTION

In the present invention, as the polymer base of the plastic sheet, it is possible to use any resin conventionally employed for production of the floppy disk jacket, such as vinyl chloride homopolymer, after-chlorinated polyvinyl chloride, vinyl chloride-vinyl acetate copolymer, PET, polycarbonate, polyimide, polyamide, polyester, polystyrene, polyvinilidene chloride, styrene-butadiene copolymer, polyethylene, polypropylene, cellulose acetate, polyvinilidene fluoride, or acrylonitrile-butadiene-styrene copolymer.

In the present invention, by "coloring" is meant that a color, including white and other than black, is developed in the appearance. By "color pigment" is meant any pigment generally used for coloring of a plastic material, for example, an organic color pigment such as an azo lake pigment, an insoluble azo pigment, a condensation azo pigment, a metal complex azo pigment, a phthalocyanine pigment, a quinacryidone pigment, a dioxazine pigment, a perinone pigment, an anthraquinone pigment, an isoindolenone pigment, a quinophthalone pigment, or perylene pigment, or an inorganic color pigment such as red iron oxide, yellow iron oxide, titian yellow, chrome oxide, cobalt blue, titanium white, cadminum yellow, cadmium red, ultramarine, clay, talc, prusssian blue, chrome yellow, chrome vermilion, zinc chromate, alumina white, precipitated barium sulfate, calcium carbonate, aluminum powder, brass powder, or mica. However, the color pigment does not include carbon black.

The term "inorganic pigment" as used herein embraces inorganic white pigments such as zinc oxide (zinc white), titanium oxide (titanium white), titanium-barium sulfate mixture, titanium-magnesium silicate mixture, and titanium oxide-calcium sulfate mixture, fillers such as calcium carbonate (chalk and natural), barium sulfate, calcium sulfate, aluminum silicate, clay, kaolin, bentonite, mica, calcium silicate, magnesium silicate (talc), calcium aluminum silicate and magnesium aluminum silicate (including hydrates thereof), silica, diatomaceous earth (including synthetic slicic anhydride), calcium oxide, magnesium oxide and aluminum hydroxide, and metal powder such as powder of aluminum, iron and brass. Among the above enumerated inorganic pigments, the inorganic white pigments are preferable among which titanium oxide is the most preferable.

In the present invention, inorganic white pigment such as titanium oxide comes within the two categories of color pigment and inorganic pigment. Therefore, the present invention also embraces a white or grey jacket fabricated of a plastic sheet containing, for example, titanium oxide only or titanium oxide and carbon black only in a predetermined amount and containing no other color pigment or other inorganic pigment. That is, in the present invention, the color pigment and the inorganic pigment need not necessarily be different from each other.

The inventors studied the blending ratio of the inorganic pigment for obtaining a desirable colored jacket and found that, when the blending ratio is increased, though the light transmittance of the jacket decreases and the light resistance is improved, processability of the jacket material (sheet processability, jacket processability, punchability, or the like) becomes low. Also, the inventors found that desirable characteristics of the jacket are obtained when the blending ratio of the inorganic pigment is within the range of 5 to 50 parts by weight per 100 parts by weight of the plastic resin, preferably within the range of 10 to 40 parts by weight per 100 parts by weight of the plastic resin, and when the blending ratio of the inorganic pigment is within the range of 5 to 40 parts by weight per 100 parts by weight of the plastic resin, preferably within the range of 5 to 30 parts by weight per 100 parts by weight of the plastic resin, and carbon black is added in an amount within the range of 0.005 to 0.5 part by weight, preferably within the range of 0.005 to 0.1 part by weight.

Various known additives, stabilizers, modifiers, or the like may be added to the polymer base of the plastic sheet. For example, when vinyl chloride-vinyl acetate copolymer is used as the polymer base, a modifier such as ABS/MBS, a stabilizer such as octyl tin, and an additive such as montan wax are normally added.

The present invention will further be illustrated by the following nonlimitative examples in which the blending ratios are in parts by weight.

EXAMPLE 1

| Vinyl chloride homopolymer ($\overline{P}$ = 800) | 100 parts |
| --- | --- |
| Stabilizer | 2.0 parts |
| Lubricant | 1.0 part |
| Methyl methacrylate-butadiene-styrene copolymer | 15 parts |
| Titanium oxide | 30 parts |
| Disazo yellow | 0.5 part |
| Azo lake red | 1.5 parts |

The above-described composition was formed into a 0.2 mm-thick sheet by calendering, and a floppy disk jacket (red) was made by bending, fusing, and punching sheet. Then, the light transmittance of the jacket was measured in accordance with JIS C6291 (1983), and the light resistance (color fastness against sunlight passing through glass) was measured in accordance with JIS K7101 (1981).

EXAMPLE 2

| After-chlorinated heatproof polyvinyl chloride (chlorine content: 65%) | 100 parts |
| --- | --- |
| Stabilizer | 2.0 parts |
| Lubricant | 1.0 part |
| Methyl methacrylate-butadiene-styrene copolymer | 15 parts |
| Titanium oxide | 30 parts |
| Disazo yellow | 0.5 part |
| Azo lake red | 1.5 parts |

A jacket (red) was made by use of the above-described composition in the same manner as in Example 1 and was tested in the same manner as in Example 1.

Example 3

| Vinyl chloride homopolymer ($\overline{P}$ = 800) | 30 parts |
| --- | --- |
| After-chlorinated heatproof polyvinyl chloride (chlorine content: 65%) | 70 parts |
| Stabilizer | 2.0 parts |
| Lubricant | 1.0 part |
| Methyl methacrylate-butadiene-styrene copolymer | 15 parts |
| Titanium oxide | 18 parts |
| Disazo yellow | 0.5 part |
| Azo lake red | 1.5 parts |

A jacket (red) was made by use of the above-described composition in the same manner as in Example 1 and was tested in the same manner as in Example 1.

EXAMPLE 4

| Vinyl chloride homopolymer ($\overline{P}$ = 800) | 100 parts |
| --- | --- |
| Stabilizer | 2.0 parts |
| Lubricant | 1.0 part |
| Methyl methacrylate-butadiene-styrene copolymer | 15 parts |
| Titanium oxide | 20 parts |
| Azo lake red | 0.5 part |
| Copper phthalocyanine blue | 2.0 parts |

A jacket (blue) was made by use of the above-described composition in the same manner as in Example 1 and was tested in the same manner as in Example 1.

EXAMPLE 5

| Polycarbonate | 100 parts |
| --- | --- |
| Titanium oxide | 22 parts |
| Azo lake red | 0.5 part |
| Copper phthalocyanine blue | 2.0 parts |

A jacket (blue) was made by use of the above-described composition in the same manner as in Example 1 and was tested in the same manner as in Example 1.

COMPARATIVE EXAMPLE 1

| | |
|---|---|
| Vinyl chloride homopolymer ($\bar{P}$ = 800) | 100 parts |
| Stabilizer | 2.0 parts |
| Lubricant | 1.0 part |
| Methyl methacrylate-butadiene-styrene copolymer | 15 parts |
| Titanium oxide | 4.0 parts |
| Disazo yellow | 0.5 part |
| Azo lake red | 1.5 parts |

A jacket (red) was made by use of the above-described composition in the same manner as in Example 1 and was tested in the same manner as in Example 1.

Results of the light transmittance and light resistance tests conducted on the samples obtained by Examples 1 to 5 and Comparative Example 1 are listed in the following table.

| | Example | | | | | Comparative |
|---|---|---|---|---|---|---|
| | 1 | 2 | 3 | 4 | 5 | Example 1 |
| Light Transmittance (%) | 0.7 | 0.7 | 0.9 | 0.6 | 0.5 | 5.2 |
| Light Resistance | JIS blue scale, Class 6 or higher | | | | | JIS blue scale, Class 3 |

EXAMPLE 6

| | |
|---|---|
| Vinyl chloride homopolymer ($\bar{P}$ = 800) | 100 parts |
| Stabilizer | 2.0 parts |
| Lubricant | 1.0 part |
| Methyl methacrylate-butadiene-styrene copolymer | 15 parts |
| Titanium oxide | 20 parts |
| Disazo yellow | 0.5 part |
| Azo lake red | 1.5 parts |
| Carbon black | 0.03 part |

A jacket (red) was made by use of the above-described composition in the same manner as in Example 1 and was tested in the same manner as in Example 1.

EXAMPLE 7

| | |
|---|---|
| After-chlorinated heatproof polyvinyl chloride (chlorine content: 65%) | 100 parts |
| Vinyl chloride homopolymer ($\bar{P}$ = 800) | 100 parts |
| Stabilizer | 2.0 parts |
| Lubricant | 1.0 part |
| Methyl methacrylate-butadiene-styrene copolymer | 15 parts |
| Titanium oxide | 20 parts |
| Disazo yellow | 0.5 part |
| Azo lake red | 1.5 parts |
| Carbon black | 0.03 part |

A jacket (red) was made by use of the above-described composition in the same manner as in Example 1 and was tested in the same manner as in Example 1.

EXAMPLE 8

| | |
|---|---|
| Vinyl chloride homopolymer ($\bar{P}$ = 800) | 30 parts |
| After-chlorinated heatproof polyvinyl chloride (chlorine content: 65%) | 70 parts |
| Stabilizer | 2.0 parts |
| Lubricant | 1.0 part |
| Methyl methacrylate-butadiene-styrene copolymer | 15 parts |
| Titanium oxide | 12 parts |
| Disazo yellow | 0.5 part |
| Azo lake red | 1.5 parts |
| Carbon black | 0.06 part |

A jacket (red) was made by use of the above-described composition in the same manner as in Example 1 and was tested in the same manner as in Example 1.

EXAMPLE 9

| | |
|---|---|
| Vinyl chloride homopolymer ($\bar{P}$ = 800) | 100 parts |
| Stabilizer | 2.0 parts |
| Lubricant | 1.0 part |
| Methyl methacrylate-butadiene-styrene copolymer | 15 parts |
| Titanium oxide | 15 parts |
| Azo lake red | 0.5 part |
| Copper phthalocyanine blue | 2.0 parts |
| Carbon black | 0.02 part |

A jacket (blue) was made by use of the above-describbed composition in the same manner as in Example 1 and was tested in the same manner as in Example 1.

EXAMPLE 10

| | |
|---|---|
| Polycarbonate | 100 parts |
| Titanium oxide | 16 parts |
| Azo lake red | 0.5 part |
| Copper phthalocyanine blue | 2.0 parts |
| Carbon black | 0.02 part |

A jacket (blue) was made by use of the above-described composition in the same manner as in Example 1 and was tested in the same manner as in Example 1.

COMPARATIVE EXAMPLE 2

| | |
|---|---|
| Vinyl chloride homopolymer ($\bar{P}$ = 800) | 100 parts |
| Stabilizer | 2.0 parts |
| Lubricant | 1.0 part |
| Methyl methacrylate-butadiene-styrene copolymer | 15 parts |
| Titanium oxide | 4.0 parts |
| Disazo yellow | 0.5 part |
| Azo lake red | 1.5 parts |
| Carbon black | 0.03 part |

A jacket (red) was made by use of the above-described composition in the same manner as in Example 1 and was tested in the same manner as in Example 1.

Results of the light transmittance and light resistance tests conducted on the samples obtained by Examples 6 to 10 and Comparative Example 2 are listed in the following table.

|  | Example | | | | | Comparative |
| --- | --- | --- | --- | --- | --- | --- |
|  | 6 | 7 | 8 | 9 | 10 | Example 2 |
| Light Transmittance (%) | 0.3 | 0.3 | 0.2 | 0.2 | 0.3 | 1.2 |
| Light Resistance | JIS blue scale, Class 6 or higher | | | | | JIS blue scale, Class 3 |

We claim:

1. A colored jacket for a floppy disk fabricated by folding or bonding a plastic sheet or sheets in a bag form, wherein said plastic sheet or sheets contain at least one color pigment, and 5 to 50 parts by weight of an inorganic pigment per 100 parts by weight of a resin.

2. A colored jacket as defined in claim 1 wherein the blending ratio of said inorganic pigment is within the range of 10 to 40 parts by weight per 100 parts by weight of the resin.

3. A colored jacket as defined in claim 1 wherein said inorganic pigment is titanium oxide.

4. A colored jacket for a floppy disk fabricated by folding or bonding a plastic sheet or sheets in a bag form, wherein said plastic sheet or sheets contain at least one color pigment, 5 to 40 parts by weight of an inorganic pigment and 0.005 to 0.5 part by weight of carbon black per 100 parts by weight of a resin.

5. A colored jacket as defined in claim 4 wherein the blending ratio of said inorganic pigment is within the range of 5 to 30 parts by weight per 100 parts by weight of the resin.

6. A colored jacket as defined in claim 4 wherein said inorganic pigment is titanium oxide.

7. A colored jacket as defined in claim 4 wherein the blending ratio of carbon black is within the range of 0.005 to 0.1 part by weight per 100 parts by weight of the resin.

* * * * *